US 009053881 B2

(12) United States Patent  
Phillips

(10) Patent No.: US 9,053,881 B2  
(45) Date of Patent: Jun. 9, 2015

(54) ARC DETECTION WITH RESISTANCE TO NUISANCE ACTIVATION THROUGH LIGHT SUBTRACTION

(75) Inventor: Timothy B. Phillips, Murfreesboro, TN (US)

(73) Assignee: Schneider Electric USA, Inc., Palatine, IL (US)

( * ) Notice: Subject to any disclaimer, the term of this patent is extended or adjusted under 35 U.S.C. 154(b) by 267 days.

(21) Appl. No.: 13/593,790

(22) Filed: Aug. 24, 2012

(65) Prior Publication Data

US 2014/0054270 A1     Feb. 27, 2014

(51) Int. Cl.
  *H01H 33/26*     (2006.01)
  *H02H 1/00*      (2006.01)

(52) U.S. Cl.
  CPC ............. *H01H 33/26* (2013.01); *H02H 1/0023* (2013.01)

(58) Field of Classification Search
  CPC ..... H01H 1/0015; H01H 39/00; H01H 79/00; H01H 33/26
  USPC ........................................................ 218/157
  See application file for complete search history.

(56) References Cited

U.S. PATENT DOCUMENTS

| | | | |
|---|---|---|---|
| 2,043,099 A | 6/1936 | Hanna | |
| 4,067,052 A | 1/1978 | Neuhoff | 361/42 |
| 4,103,291 A * | 7/1978 | Howe et al. | 340/522 |
| 4,403,124 A * | 9/1983 | Perkins et al. | 218/122 |
| 4,471,309 A * | 9/1984 | Lange et al. | 324/463 |
| 4,516,022 A | 5/1985 | Lindgren | 250/227 |
| 4,547,769 A * | 10/1985 | Tanigaki et al. | 340/626 |
| 4,702,553 A | 10/1987 | Buchmuller et al. | 350/96.29 |
| 4,791,518 A | 12/1988 | Fischer | |
| 4,937,698 A * | 6/1990 | Toya et al. | 361/86 |
| 5,714,886 A | 2/1998 | Harris | 324/601 |
| 5,933,308 A | 8/1999 | Garzon | |
| 5,986,060 A | 11/1999 | Li et al. | 530/351 |
| 6,229,680 B1 | 5/2001 | Shea | 361/42 |
| 6,247,003 B1 | 6/2001 | Cummins et al. | 706/22 |
| 6,337,427 B1 | 1/2002 | Alario et al. | 585/319 |
| 6,433,976 B1 | 8/2002 | Phillips | 361/42 |
| 6,525,918 B1 | 2/2003 | Alles et al. | 361/93.1 |
| 6,621,669 B1 | 9/2003 | Haun et al. | 361/42 |
| 6,657,150 B1 * | 12/2003 | Shea et al. | 218/154 |
| 7,069,116 B2 | 6/2006 | Kunsman et al. | 700/48 |
| 7,253,630 B1 * | 8/2007 | Zhou et al. | 324/424 |
| 7,391,218 B2 | 6/2008 | Kojori et al. | 324/520 |
| 7,536,914 B2 | 5/2009 | Land et al. | 73/705 |

(Continued)

FOREIGN PATENT DOCUMENTS

| | | | |
|---|---|---|---|
| DE | 3141374 A1 | 4/1983 | G01R 31/12 |
| EP | 2429050 | 3/2012 | |

OTHER PUBLICATIONS

PCT International Search Report for International Application No. PCT/US2012/049936 mailed Dec. 17, 2012 (3 pages).

(Continued)

*Primary Examiner* — Truc Nguyen
(74) *Attorney, Agent, or Firm* — Locke Lord LLP

(57) ABSTRACT

In an electrical distribution system having an arc management system for removal of arcing voltage from feeder circuits triggered at least in part by light signals, a secondary optical detector monitors a downstream branch circuit breaker in the feeder circuit compartment to produce an optical signal for arc detection more accurately reflecting the possibility of an arcing fault.

20 Claims, 3 Drawing Sheets

(56) References Cited

U.S. PATENT DOCUMENTS

| | | | |
|---|---|---|---|
| 8,563,888 B2 * | 10/2013 | Bohori et al. | 218/157 |
| 2002/0118022 A1 | 8/2002 | Dring et al. | 324/536 |
| 2003/0151414 A1 | 8/2003 | Shea | 324/555 |
| 2004/0054921 A1 | 3/2004 | Land, III | 713/200 |
| 2008/0077368 A1 | 3/2008 | Nasle | 703/4 |
| 2009/0161272 A1 | 6/2009 | Asokan et al. | 361/43 |
| 2010/0321838 A1 | 12/2010 | Wu et al. | 361/42 |

OTHER PUBLICATIONS

PCT International Written Opinion for International Application No. PCT/US2012/049936 mailed Dec. 17, 2012 (6 pages).

International Search Report for International Application No. PCT/US2013/051192—Date of Completion of Search: Oct. 3, 2013—3 pages.

* cited by examiner

ARC DETECTION WITH RESISTANCE TO NUISANCE ACTIVATION THROUGH LIGHT SUBTRACTION

BACKGROUND OF THE INVENTION

1. Field of the Invention

The present invention relates generally to electrical distribution equipment and conductors. The invention relates more particularly to controlling the misdetection of arc faults by arc fault detection systems in electrical systems.

2. Discussion of the Known Art

Switchgear enclosures are commonly employed in electrical power distribution systems for enclosing circuit interrupters and switching equipment associated with the distribution system. Typically, switchgear enclosures are comprised of a number of individual stacked or adjacent compartments, each of the switchgear compartments receiving electrical power from a power source and distributing the electrical power through a feeder circuit to one or more loads. Generally, each of the switchgear compartments includes circuit breakers or other interrupters for breaking electric power in a particular feeder circuit in response to hazardous current overloads in the circuit, or normal switching events.

In addition to current overloads, the switchgear enclosure may encounter other hazardous conditions known as arcing faults. Arcing faults occur when electric current "arcs" or flows through ionized gas between conductors, e.g., between two ends of broken or damaged conductors, or between a conductor and ground in the switchgear enclosure. Arcing faults typically result from corroded, worn or aged wiring or insulation, loose connections and electrical stress caused by repeated overloading, lightning strikes, vermin, dropped wrenches during maintenance, etc. Particularly in medium-to-high voltage power distribution systems, the ionized gas associated with arcing faults may be released at pressures and temperatures sufficient to severely damage or destroy the switchgear equipment and/or cause severe burning injuries or death to operating personnel.

Switchgear enclosures generally provide arc-resistant metal switchgear compartments, often with a means for venting the gases from the compartments in the event of an arcing fault. These compartments are designed to withstand the pressures and temperatures of the gases associated with an arcing fault and reduce the likelihood or extent of damage to switchgear equipment by preventing the gases from entering adjacent switchgear compartments. Safety to operating personnel is enhanced by channeling and venting the hot gases away from operating personnel. However, because these systems do not eliminate the generation and release of hot gases associated with arcing faults, they do not completely eliminate the risk of injury to operating personnel and/or damage to the switchgear equipment.

Both passive and active arc control means are know in the art. Passive means include directed venting of the arc blast energy and gasses out of the cabinet. Other passive means may include reinforcement of the cabinet structure in an effort to withstand the blast. Due to the extremely high power which is generated in an arcing fault, they are typically more damaging, more quickly, than other types of faults and it is therefore desirable to have a system which will respond to these types of faults very quickly to remove the voltage supplying the arc. Limiting arc fault duration through active systems is particularly important in limiting potential damage from the blast. Active means usually include some form of sensing and a switching mechanism to control the current. Of course, the quicker the arc is sensed and controlled the less harm is likely to be done by the arcing event.

One method employed for enhancing the safety and durability of switchgear enclosures in the event of arcing faults, as described in U.S. Pat. No. 5,933,308 to Garzon, is to provide arc-resistant metal switchgear compartments with a fast-acting means for grounding or shunting the source bus current at the feeder breaker for the equipment in the event of an arcing fault condition. This action extinguishes the arc almost immediately by removing the voltage sustaining it, and causes a bolted fault right at the feeder breaker, whether said feeder breaker is the main breaker inside the equipment, or a feeder breaker elsewhere in the electrical system, and the feeder breaker then will break the circuit using its normal protective functions. This is done in Garzon by monitoring the rise rate of the source or main bus current and monitoring the light produced by arcing events in each feeder compartment by optical detectors. The current signal and the optical signal are AND'ed together to produce an arcing fault detection signal which activates an arc diverter mechanism within the appropriate time frame. In another example, as described in U.S. Pat. No. 7,499,251 to Byron, arc fault control is done by detection through a comparison of current on the main bus against the current through the feeder lines, whereby a difference in current gives a first detection signal. The first detection signal can be used directly, or AND'ed with other detection signals from optical detectors on the feeder lines, to provide the activation signal for operating the arc diverter. Other known arcing fault sensing circuits may use only optical detectors. Removal of the voltage sustaining the arc in known systems may be by operation of an arc extinguishing mechanism including the feeder breaker, an arc diverter mechanism, or both, which are responsive to the arc fault detection systems.

SUMMARY OF THE INVENTION

Operation of an arc extinguishing mechanism such as activating an arc diverter device, opening of the equipment feeder breaker, or both, will cause complete interruption in operation of the equipment, and can be quite stressful to the equipment and electrical system. As such it is desirable to avoid any kind of nuisance operation.

A quick, economical, mechanism for controlling and extinguishing arc events with a minimum of false activation would be welcome in the art. In known arc fault detection systems various current sensors and light sensors are used inside the cabinet to detect current anomalies and light.

Many conventional arc flash detection systems use a single, wide field of view light sensor per feeder circuit compartment to detect light produced by undesirable arcing flash events. For medium voltage equipment, in which most circuit breakers use vacuum bottles to contain the breaking contacts, this is a perfectly practical solution. But most low voltage equipment uses air-break, i.e. not vacuum or gas filled, circuit breakers which can produce a significant amount of light from their arc chutes or vents when they trip, i.e., operate in their ordinary manner to interrupt fault currents. These breaker trip events produce a magnitude of light that can easily be sufficient to trigger conventionally used light detectors for arcing faults and thus initiate a false arcing fault detection when the system should merely let the breaker trip and isolate the feeder circuit rather than shutting down the system.

To that end, the present invention in its various aspects and embodiments teaches and provides an arc management system having a light sensor including a primary, wide-field, optical detector and a secondary, narrow field, optical detector monitoring light in proximity to the circuit breaker (hereinafter sometimes merely referred to for convenience as a "breaker"). In some aspects of the invention the secondary light detector may include a fiber optic member aimed at an exhaust vent or other light emitting opening of the breaker case, for detecting and signaling light emissions of the circuit breaker. By subtracting the breaker-specific light emissions from the primary wide field optical detector for arcing fault light emissions, and determining if the subtracted total light signal is sufficient to generate an optical based trip signal to an arc fault detection system; proper control over inadvertent activation of the arc extinguishing operations, i.e. the arc diverter, feeder breaker, or the like, may be obtained.

Some aspects of the invention may be particularly suited or adaptable for arc management around a molded case circuit breaker contained within an enclosed low voltage switch gear cabinet.

BRIEF DESCRIPTION OF THE DRAWINGS

The foregoing and other advantages of the present disclosure will become apparent upon reading the following detailed description and upon reference to the drawings of which.

DETAILED DESCRIPTION

Figure 1:
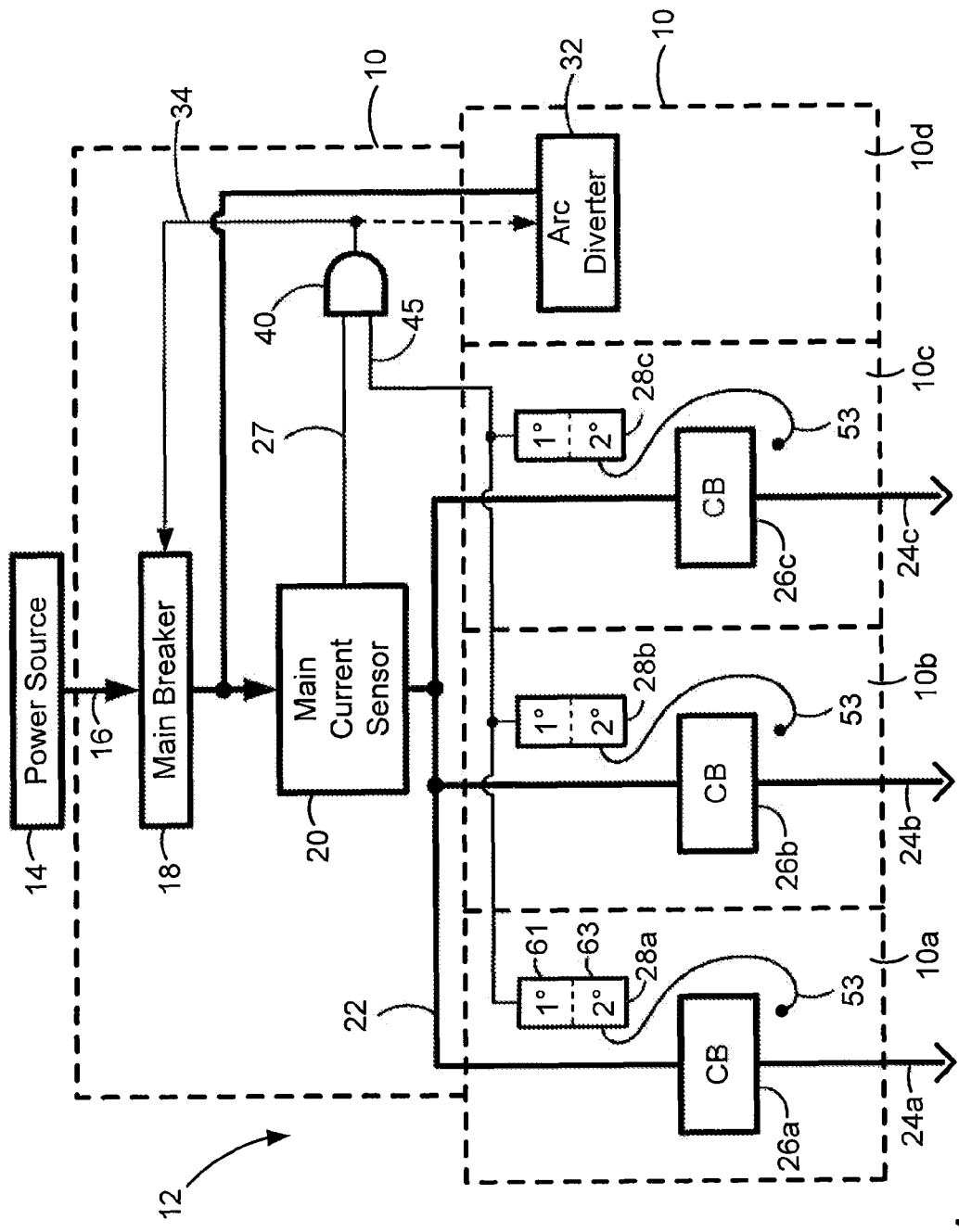
FIG. 1 is a block diagram of an arcing fault protection system for a switchgear enclosure according to one embodiment of the present invention.

Turning now to the drawings and referring first to FIG. 1, there is shown in phantom a switchgear enclosure, generally designated by reference numeral 10, including individual compartments 10a, 10b, 10c and 10d, collectively 10, for housing various components of an electrical distribution system 12 and having an arc fault detection system of various components as further explained below. A power source 14, which may comprise, for example, a utility company power transformer, supplies power for the distribution system 12 through a main circuit 16. The main circuit 16 is typically routed through an upstream, i.e. a main or feeder, breaker 18. The arc fault detection system may include a main current sensor 20 such as a toroidal coil provided for monitoring the main circuit 16 for characteristics of arcing faults, as is known in the art. A source bus 22 connected to the main circuit 16 distributes electrical power from the power source 14 to a plurality of feeder circuits 24a, 24b, 24c, each of which is routed through one of the switchgear compartments 10a-c. Each of the feeder circuits, collectively 24, typically supplies power to one or more loads (not shown) downstream of the switchgear enclosure 10. It will be appreciated that the number of feeder circuits 24 shown here, as well as the number of switchgear compartments 10a-d, is exemplary only, and may be varied according to the particular type and/or application of the switchgear enclosure 10.

Figure 2:
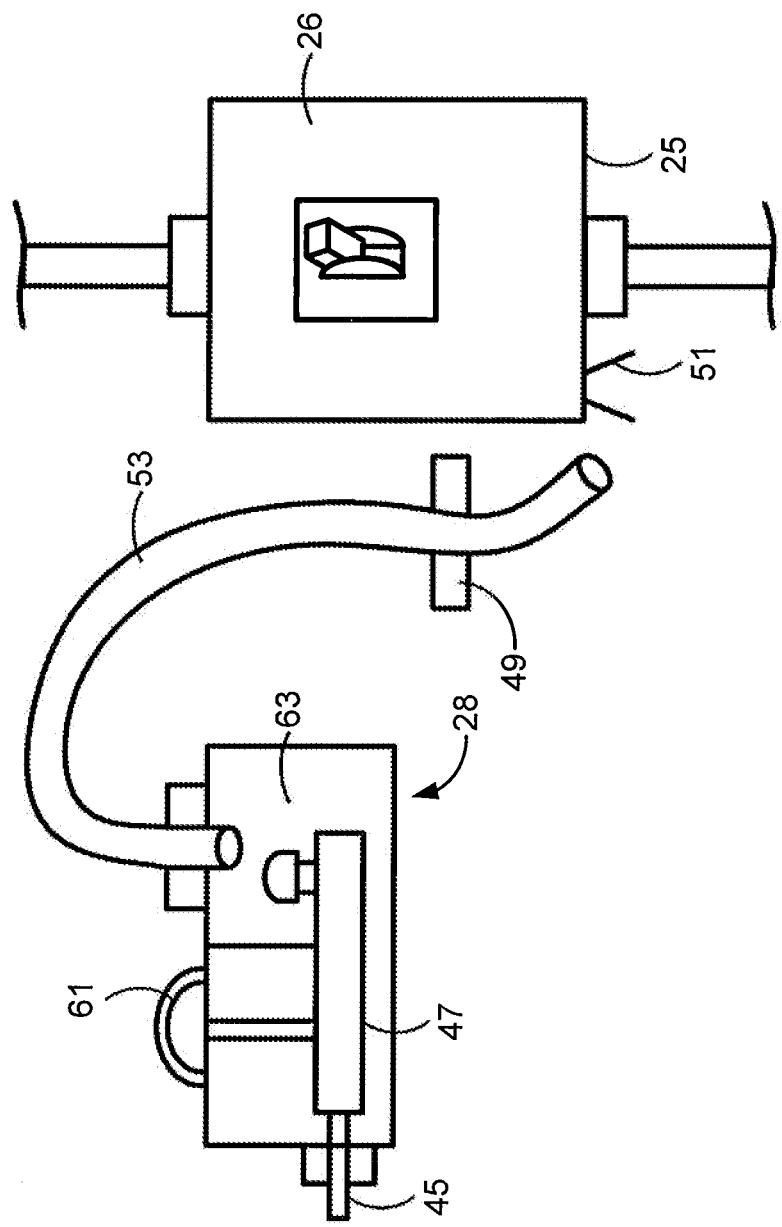
FIG. 2 is a detail view of an exemplary embodiment of one suitable arrangement of a light sensor having a narrow field secondary light detector according to some aspects of the invention, being placed in proximity to the arc vent of a molded case circuit breaker.

The switchgear enclosure 10 typically includes switching and monitoring equipment associated with the respective feeder circuits 24. For example, in the embodiment shown in FIG. 1, the switchgear enclosure 10 includes a plurality of circuit interrupters, here shown as circuit breakers 26a,b,c distributed among the compartments 10a,b,c. Also included are the components of an arc fault detection system including a plurality of light sensors 28a,b,c distributed among the compartments. These light sensors, collectively 28, will each include primary optical detectors 61 such as a typical single, wide field of view detector, to detect light produced by undesirable arc flash, and secondary optical detectors 63 for monitoring the branch circuit breakers 26. In one embodiment, the primary and secondary optical detectors are contained within a single unit along with associated electronics for combining their signals and determination of a threshold for an optical output signal, as shown in FIG. 2, which may provide for ease of manufacture, placement, and control.

As shown in the exemplary first compartment 10a, a secondary optical detector 63, monitors the breaker 26. It will be understood that each feeder circuit compartment may have the arrangement described herein for the first compartment. Referring also to the detail view of FIG. 2, the circuit breaker 26 may for example be a three phase molded case circuit breaker, provided for interrupting, i.e. breaking, electric power in the respective feeder circuits 24 in response to current overloads. Preferably a fiber optic line 53 is held by a bracket 49 in proximity to an exhaust vent 51 in the case 25 of the circuit breaker 26, for transmitting arcing light from a trip event occurring within the circuit breaker 26. The fiber optic line 53 will transmit the light to the secondary detector 63, thereby placing the detectors 28 out of the path of the arc gases and debris exiting the breaker case 25. It will be appreciated that either or both optical detectors may be combined with fiber optics if such implementation is desired by the designer.

Figure 3:
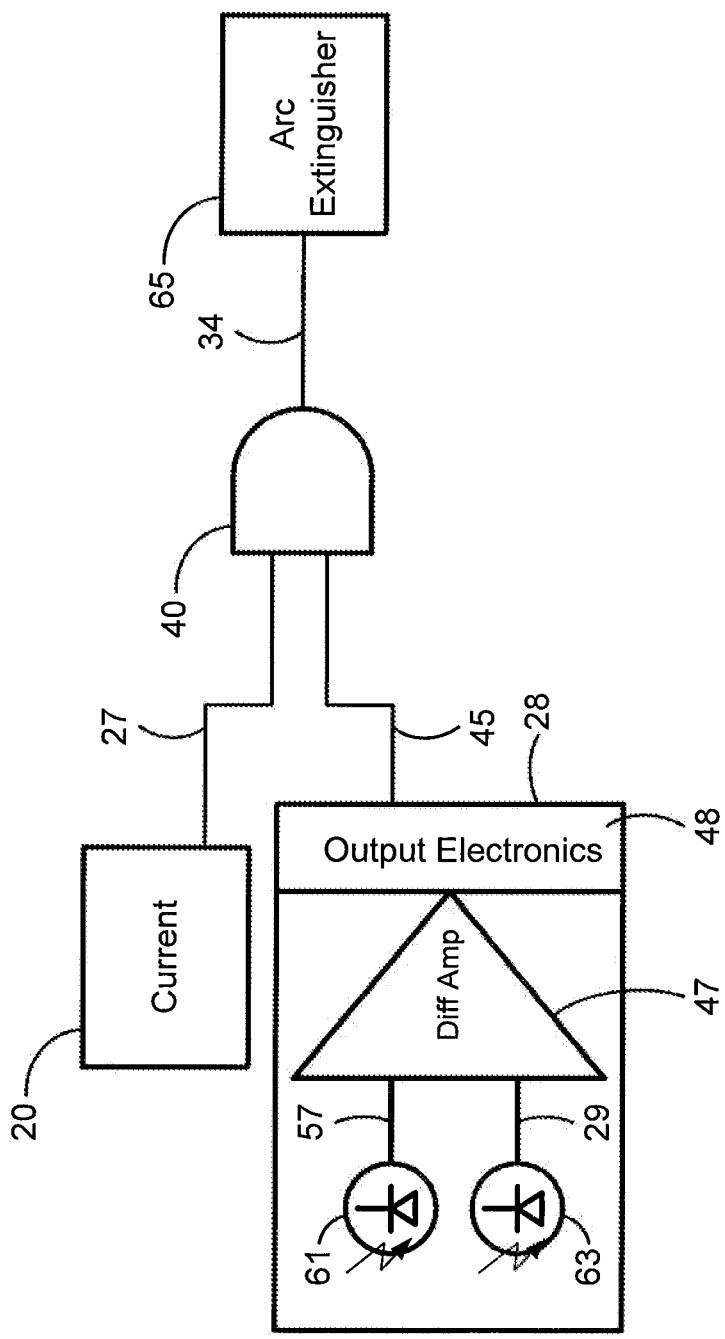
FIG. 3 is a schematic illustration of an arc fault detection system which may be used to generate an arcing fault detection signal in the system of FIG. 1.

Referencing FIG. 3, the secondary detector 63 then generates a signal on its output line 29 to a differential amplifier 47. The differential amplifier 47 accepts and combines input 57 from the primary optical detector 61 and the input 29 from the secondary optical detector 63 and subtracts the breaker trip event light component of the secondary optical detector from the arcing light component of primary optical detector. The differential amplifier 47 outputs the combined, i.e. subtracted, total light signal 45 to output electronics 48 for a threshold determination; via comparator or the like, and if the threshold is reached, a high output signal is sent from output electronics 48 to the triggering AND gate 40 of the arc fault detection system.

The light signal subtraction can be done in any number of conventional ways such as the differential amplifier illustrated, logic gates, a digital controller or the like. Preferably the present light sensor may determine a threshold for outputting an optical signal inside the detector 28 such as by output electronics 48 including a comparator for the differential amplifier signal to a reference level, which can be adjustable, and additional electronics for producing a suitable signal to the AND gate. The output electronics may be suitably configured in a variety of ways by the designer, keeping in mind that speed of operation for arc extinguishment is a primary concern.

The optical signal 45 is thus a decision made inside the light sensor 28 that sufficient light has been detected to warrant a trip or actuation of the arc extinguisher. The optical signal 45 may be used separately or may then be ANDed with the current detection signal 27, as shown, and if both signals are active, the arc extinguisher 65 will be commanded to operate. In accordance with FIG. 3, the arc fault detection system will trigger an arc extinguishing mechanism 65, which, upon receipt of an arcing fault detection signal 34, quickly removes voltage from all downstream circuits, thereby extinguishing arcing fault currents which may have occurred on any of the feeder circuits 24 before they are permitted to generate gases at dangerous pressures and/or temperatures. The arc diverters 32 and breakers 18 may be referred to herein for convenience either individually or collectively as an "arc extinguisher" when serving that function. The various types of arc extinguisher apparatuses may be used individually or together as indicated by the dotted control line off of line 34 to the arc diverter 32. The selection of types and operation of the extinguishing apparatus and their location are not central to the invention and are left to the choice of the designer. In some embodiments, for example, the arcing fault currents can be extinguished by the arc diverter 32 shorting the phases together in less than about 4 milliseconds, effectively eliminating the generation of dangerous gases associated with the arcing fault. In some embodiments the feeder breaker may be signaled to trip immediately without waiting for its ordinary overcurrent trip conditions.

The disclosed arrangement is intended to minimize the chance that shutdown of the system will occur due to "false" signals because it is unlikely that false signals will be detected by both the current sensor 20 and a light sensor 28. It will be appreciated that the present system of light sensors with separate optical detectors will work equally well with arc fault detection systems that are triggered only by optical signals.

Having thus described a system of control for arc management systems for electrical systems; it will be appreciated that many variations thereon will occur to the artisan upon an understanding of the present invention, which is therefore to be limited only by the appended claims.

The invention claimed is:

1. An arc fault detection system for an electrical enclosure, comprising
   a circuit breaker within the enclosure,
   a primary optical detector for detecting visible light from arcing faults within the enclosure and emitting a primary optical signal representative of its detected light,
   a secondary optical detector for detecting visible light from a circuit breaker trip event within the enclosure and emitting a secondary optical signal representative of its detected light,
   a means for combining the primary optical signal and the secondary optical signal, and
   the arc fault detection system operating an arc extinguisher to remove voltage from a feeder circuit in the enclosure based upon the combined optical signal.

2. The arc fault detection system for an electrical enclosure of claim 1 wherein the means for combining subtracts the secondary optical signal from the primary optical signal.

3. The arc fault detection system for an electrical enclosure of claim 2 wherein the subtracting is done with a differential amplifier.

4. The arc fault detection system for an electrical enclosure of claim 1 wherein the primary optical detector is a wide field detector.

5. The arc fault detection system for an electrical enclosure of claim 1 wherein the secondary optical detector is a narrow field detector.

6. The arc fault detection system for an electrical enclosure of claim 5 wherein the secondary optical detector includes a fiber optic cable held in proximity to a circuit breaker arc vent.

7. The arc fault detection system for an electrical enclosure of claim 1 wherein the primary and secondary optical detectors are combined in a single light sensor apparatus.

8. The arc fault detection system for an electrical enclosure of claim 7 wherein the light sensor apparatus further contains electronics establishing a threshold for output of a signal from the light sensor apparatus.

9. An arc fault management system for an electrical enclosure, comprising:
   a circuit breaker within the enclosure,
   a primary optical detector for detecting visible light from arcing faults within the enclosure and emitting a primary optical signal representative of its detected light,
   a secondary optical detector for detecting visible light from a circuit breaker trip event within the enclosure and emitting a secondary optical signal representative of its detected light,
   a means for combining the primary optical signal and the secondary optical signal, and
   an arc extinguisher to remove voltage from a feeder circuit in the enclosure based upon the combined optical signal.

10. The arc fault management system for an electrical enclosure of claim 9 wherein the arc extinguisher includes an arc diverter, a feeder circuit breaker, or both.

11. A method of arc fault signaling for an arc fault detection system within an electrical enclosure, comprising:
    placing a primary optical detector for detecting light from arcing faults within the enclosure and emitting a primary optical signal representative of its detected light,
    placing a secondary optical detector for detecting light from breaker trip events in proximity to a light emitting portion of a circuit breaker case and emitting a secondary optical signal representative of its detected light,
    combining the primary and secondary optical signals to produce a combined optical signal, and
    receiving the combined optical signal at the arc fault detection system for operation of an arc extinguishing mechanism of the arc fault detection system.

12. The method for arc fault signaling system of claim 11 wherein said optical detectors detect visible light.

13. The method for arc fault signaling system of claim 11 wherein the step of receiving said signal at the arc fault detection system as evidence of a possible arc fault includes using the signal as one of a plurality of inputs to eliminate falsely positive indications of an arcing event.

14. The method for arc fault signaling system of claim 11 wherein the step of combining includes subtracting the secondary optical signal from the primary optical signal.

15. The method for arc fault signaling system of claim 14 wherein the subtracting is done with a differential amplifier.

16. The method for arc fault signaling system of claim 11 wherein the primary optical detector is a wide field detector.

17. The method for arc fault signaling system of claim 11 wherein the secondary optical detector is a narrow field detector.

18. The method for arc fault signaling system of claim 11 wherein the secondary optical detector includes a fiber optic cable held in proximity to a circuit breaker arc vent.

19. The arc fault detection system for an electrical enclosure of claim 5 wherein one end of the fiber optic cable is in proximity to the circuit breaker arc vent and another end of the fiber optic cable is in proximity to the secondary optical detector.

20. The method for arc fault signaling system of claim 18 wherein one end of the fiber optic cable is in proximity to the circuit breaker arc vent and another end of the fiber optic cable is in proximity to the secondary optical detector.

* * * * *